United States Patent [19]
Arvidson

[11] Patent Number: 5,101,980
[45] Date of Patent: Apr. 7, 1992

[54] MAGNETIC SEPARATOR ASSEMBLY FOR USE IN MATERIAL SEPARATOR EQUIPMENT

[76] Inventor: Bo R. Arvidson, 14522 W. Archer Ave., Golden, Colo. 80401

[21] Appl. No.: 595,618

[22] Filed: Oct. 11, 1990

[51] Int. Cl.⁵ .......... B03C 1/18; B65G 23/44; B65G 43/00
[52] U.S. Cl. .......... 209/546; 198/807; 198/810; 198/813; 209/219; 209/223.2; 209/225; 209/231
[58] Field of Search .......... 209/213, 219, 222, 223.2, 209/225, 228, 231, 546, 549, 636; 198/807, 810, 813, 816

[56] References Cited

U.S. PATENT DOCUMENTS

| | | | |
|---|---|---|---|
| 1,365,965 | 1/1921 | Buchanan | 209/219 |
| 3,926,792 | 12/1975 | Buford | 209/219 X |
| 4,173,904 | 11/1979 | Repetto | 198/807 X |

FOREIGN PATENT DOCUMENTS

| | | | |
|---|---|---|---|
| 0180106 | 5/1986 | European Pat. Off. | 198/807 |
| 0017046 | 11/1907 | Norway | 209/219 |
| 0920775 | 3/1963 | United Kingdom | 198/807 |

Primary Examiner—Michael S. Huppert
Assistant Examiner—Edward M. Wacyra
Attorney, Agent, or Firm—Timothy J. Martin; Dana S. Rewoldt

[57] ABSTRACT

A material separator for separating non-magnetic components from magnetic components in a material is provided. The material separator has a support frame, a magnetic roller, an idler roller and a conveyor belt. The idler roller is rotatably mounted on an inclined slideway so that tension on the conveyor belt is maintained by the weight of the idler axle and idler roller. The inclined slideways may be provided by pivot arms and adjusting elements are provided to adjust the angles of inclination to the horizontal, thereby allowing adjustability of the belt tension. Detectors monitor the tracking path of the belt so that an adjustment to the angle of inclination of one of the slideways automatically corrects deviations from the tracking path. The magnetic separator is preferably a modular unit mountable in framework having an upstream feed assembly and a downstream collection assembly, either in single or multi-stage separator apparatus.

27 Claims, 5 Drawing Sheets

MAGNETIC SEPARATOR ASSEMBLY FOR USE IN MATERIAL SEPARATOR EQUIPMENT

FIELD OF THE INVENTION

The present invention broadly concerns material separators of the type employing a magnetic roller to separate materials into magnetic and non-magnetic components. In particular, though, the present invention relates to conveyor belt assemblies used in conjunction with such magnetic roller separators and belt tracking techniques corresponding to these conveyor belt assemblies.

BACKGROUND OF THE INVENTION

A processing step of separating a conglomerate materials into various components has proved highly valuable in modern industrial processes. Many different separation techniques have been utilized in the past with these techniques relying on differing characteristics of the components, such as size, weight, specific gravity and the like, which constitute the material. It has long been recognized in certain industrial processes that the separation of a particulate material into magnetic and non-magnetic components has particular utility. Among various magnetic separation apparatus is that known as the high-intensity magnetic roll separator, and this separator has particular applications in the dry separations of particulate materials.

Typically, magnetic roll separators are configured to have a cylindrical magnetic roller located at a downstream end, a cylindrical idler roller located at an upstream end and a relatively thin conveyor belt encircling the magnetic roller and the idler roller. Material to be separated is deposited in an upper conveying portion of the belt at an upstream end so that it is advanced towards the downstream and is discharged as the conveyor belt moves around the magnetic roller. Magnetic components are attracted to the magnetic roller and thus have a different discharge trajectory than non-magnetic components as the various particles leave the conveyor belt at the discharge region associated with the magnetic roller. The difference in discharge trajectories results from the fact that non-magnetic components are affected only by a gravitational force and the "centrifugal force" while magnetic components are subjected not only to "centrifugal" and gravitational force but also to the magnetic force attracting the particulate material to the magnetic roller. This magnetic attraction causes the magnetic components to "cling" to the conveyor belt adjacent the magnetic roller for a slightly longer period of time than the non-magnetic components as the conveyor belt advances around the magnetic roller. The discharge component streams may accordingly be collected in a collection bin provided with suitably positioned deflectors to separate the different streams of particles. This procedure may be repeated over multiple stages to obtain an increasingly refined product.

One problem that has confronted magnetic roll separators, however, is conveyor belt drift as the conveyor belt tracks around the pair of rollers. This belt tracking difficulty encountered with magnetic roll separators stems from the fact that the length of the rollers are long relative to the distance of separation between the magnetic roller and the idler roller (the "roller distance"). This fact, coupled with the need for relatively thin belts necessary to achieve strong effective magnetic forces, militates against incorporation of conventional belt tracking systems with magnetic roll separators. For example, the use of shaped rollers, either crowned or convex, is inappropriate since the roller distance must be substantially increased so that it is much greater than desired from an optimum configuration for materials processing. This limits the separator capacity due to the maximum load limit on the belt to avoid excessive sagging. Further, the thin conveyor belts used for magnetic roller separation are constructed of materials such as Kevlar ® (a trademark of the DuPont Corporation) fabric, in order to have substantial strength while keeping the belt thin. These belt fabrics have relatively small elasticity which limits the advantages of configured rollers. Accordingly, magnetic roll separators that employ configured rollers either operate with thick belts or operate with less than optimum processing capacity.

Another conventional belt tracking technique utilizes mechanical guides to confine the conveyor belt in a desired tracking path. A major disadvantage, here, is the susceptibility of the conveyor belts to failure due to stress caused by the mechanical guides, such as pins, studs, guiderails and the like. In order to reduce belt failure, the thickness of the belts are increased which again results in reduced performance of the separation since the magnetic force decreases proportionally with an increase in the thickness of the belt.

Accordingly, there remains a need for improved belt tracking structure which simultaneously allows the use of a relatively thin belt having a short roller distance and which system minimizes the stress placed on the belt during operation.

SUMMARY OF THE INVENTION

It is an object of the present invention to provide a new and useful belt tracking system for use with magnetic roll separators which is simple in construction yet which minimizes mechanical stress on the conveyor belt.

Another object of the present invention is to provide a belt tracking system for a material separator where the separator employs a conveyor belt that has a relatively large width compared to roller distance.

A further object of the present invention is to provide an idler roller mounting structure for a conveyor belt so that tension on the conveyor belt as well as tracking may be adjusted in a simplified manner.

Still a further object of the present invention is to provide automatic tracking of a conveyor belt in a material separator assembly so that deviations of the conveyor belt from a desired tracking path may be automatically corrected.

Yet a further object of the present invention is to provide a material separator module of the magnetic roller type which may be readily incorporated into single and multi-stage material separator systems.

According to the present invention, then, a material separator assembly is provided for use with a material separator apparatus wherein the apparatus includes a framework structure that mounts a feed assembly in an upstream location and a collection assembly at a downstream location. The material separator assembly according to this invention, then, is adapted to receive particulate material at an upstream region and to process the particulate material by separating the particulate material into magnetic and non-magnetic components by discharging the material at a downstream region in a manner such that the magnetic and non-magnetic components have different discharge trajectories.

In its broad form, this material separator assembly includes a support frame and a pair of mounting members connected to the support frame at an upstream location and spaced apart from one another. Each of the mounting members provides an incline support surface that extends upwardly and forwardly in a downstream direction at an acute angle of inclination with respect to the horizontal. An idler roller is rotatably mounted on an idler axle, and the idler axle has opposite ends slideably supported on the inclined support surfaces of the mounting members so that the idler roller is rotatably mounted with respect to the support frame and is located at an upstream location. A magnetic roller is rotatably journaled with respect to the support frame for rotation about a magnetic roller axis and is positioned downstream of the idler roller. A continuous loop conveyor belt extends around the magnetic roller and the idler roller so as to have an upper conveying portion and a lower return portion. Tension is maintained on the conveyor belt by the force of gravity acting on the idler roller and the idler axle which biases the idler axle downwardly and rearwardly away from the magnetic roller axis along the incline support surfaces. Drive means, such as a drive motor, is provided to advance the conveyor belt around the magnetic roller and the idler roller along a tracking path whereby the conveying portion can receive the particulate material at the upstream region and can convey the particulate material across the magnetic roller at the downstream location to discharge the material in a manner such that a magnetic components of the particulate material interact with the magnetic field generated by the magnetic roller thereby having a different discharge trajectory from the non-magnetic components of the particulate material.

Preferably, the separator assembly is a unitary or modular construction having a central frame that is securable to a framework structure at a selected location. The mounting members may be formed by a pair of pivot arms each provided with an elongated slot forming a slideway having a lower surface which defines the inclined support surface for the free ends of the idler axle. The incline support or slide surface may have a layer of low friction material, such as ultra high molecular weight plastic, polytetrafluoroethylene, ceramic material and the like, and this layer may be provided by an inverted channel piece that is mounted in the slot to engage the pivot arm. The idler axle is preferably cylindrical and has a diameter larger than the width of the elongated slot, but the free ends have flattened faces diametrically opposed to one another so as to fit within each slot for free sliding motion therealong. In this manner, the idler axle may float without rotation in the slots provided by the pair pivot arms. The magnetic roller may be rotatably journaled in a pair of spaced apart bearing blocks which are secured to a mounting block forming a part of the central support frame.

Preferably, the mounting members are in the forms of pivot arms which are pivotally attached to mounting brackets at opposite sides of the central support frame so that the angle of inclination may be adjusted by adjusting members. In the preferred form of the invention, one side of the roller is adjusted by a manually set adjustment screw while the other side may be automatically adjusted by means of a cam element driven by a reversible motor that is connected to a controller. The tracking position of the conveyor belt is then monitored, for example, by a pair of proximity detectors monitoring the position of the side edges of the conveyor belt, and these detectors generate a signal which is transmitted to the controller. The controller then operates the cam motor so as to vary the angle of inclination at one side of the idler roller thus correcting any deviations in belt tracking.

These and other objects of the present invention will become more readily appreciated and understood from a consideration of the following detailed description of the preferred embodiment when taken together with the accompanying drawings, in which:

DETAILED DESCRIPTION OF EXEMPLARY EMBODIMENT

The present invention is directed to a separator assembly operative to separate particulate material into magnetic and non-magnetic components. This type of assembly is known in the industry as a high-intensity magnetic roll separator. The present invention is preferably in the form of a self contained unit or module having an improved conveyor belt structure which module may be incorporated into a single or multi-stage material separator. However, it should be understood that the present invention is not limited to high-intensity magnetic separation processes and that the principles of the improved conveyor belt structure discussed herein may readily be incorporated into a material separator apart from the modular construction described with respect to the exemplary embodiment. As discussed in detail below, the exemplary embodiment of the present invention provides an improved idler roller mounting structure as well as an improved conveyor belt tracking system provided in conjunction with the idler roller mounting structure.

Figure 1:
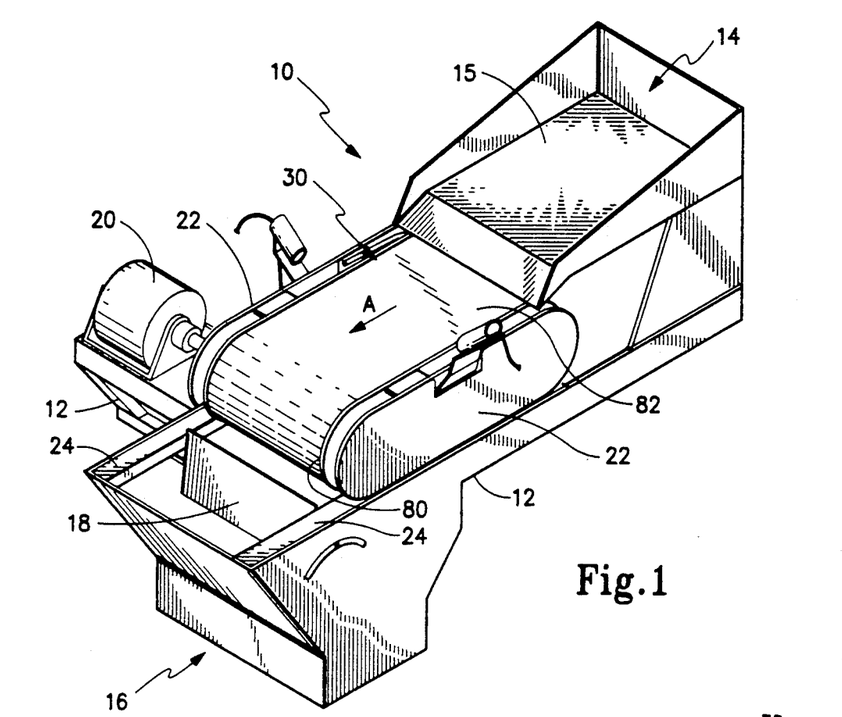
FIG. 1 is a perspective view showing a single stage material separator incorporating the separator assembly according to the exemplary embodiment of the present invention.

As is shown in FIG. 1, then, a single stage material separator 10 includes a framework structure 12 which supports a feed assembly 14, located at an upstream region and a collection assembly 16 located at a down stream region. A separator assembly 30 according to the exemplary embodiment of the present invention is supported on framework 12 in a generally horizontal orientation between feed assembly 14 and collector assembly 16. A drive motor 20 is provided to operate separator assembly 30 to circulate a continuous loop conveyor belt 80 around a pair of rollers (described below) so that an upper conveying portion 82 of belt 80 moves from the upstream region to the downstream region in a direction shown by arrow "A". Thus, particulate material received in bin 15 of feed assembly 14 may be dispensed at an upstream location onto upper conveying portion 82 after which it is advanced to the downstream location where it is discharged into collection assembly 16. Feed assembly 14 may be any standard type of particulate feed, such as a vibratory feed assembly or the like, as is known in the art. Separator assembly 30 may be provided with optional guard panels 22, if desired.

Figure 2:
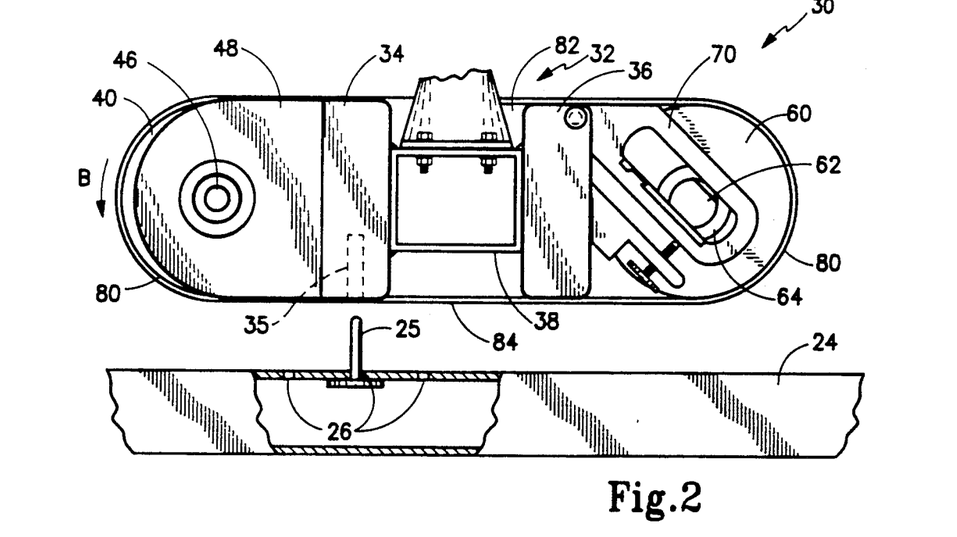
FIG. 2 is a side view in elevation, partially broken away, showing the separator assembly of FIG. 1.
Figure 3:
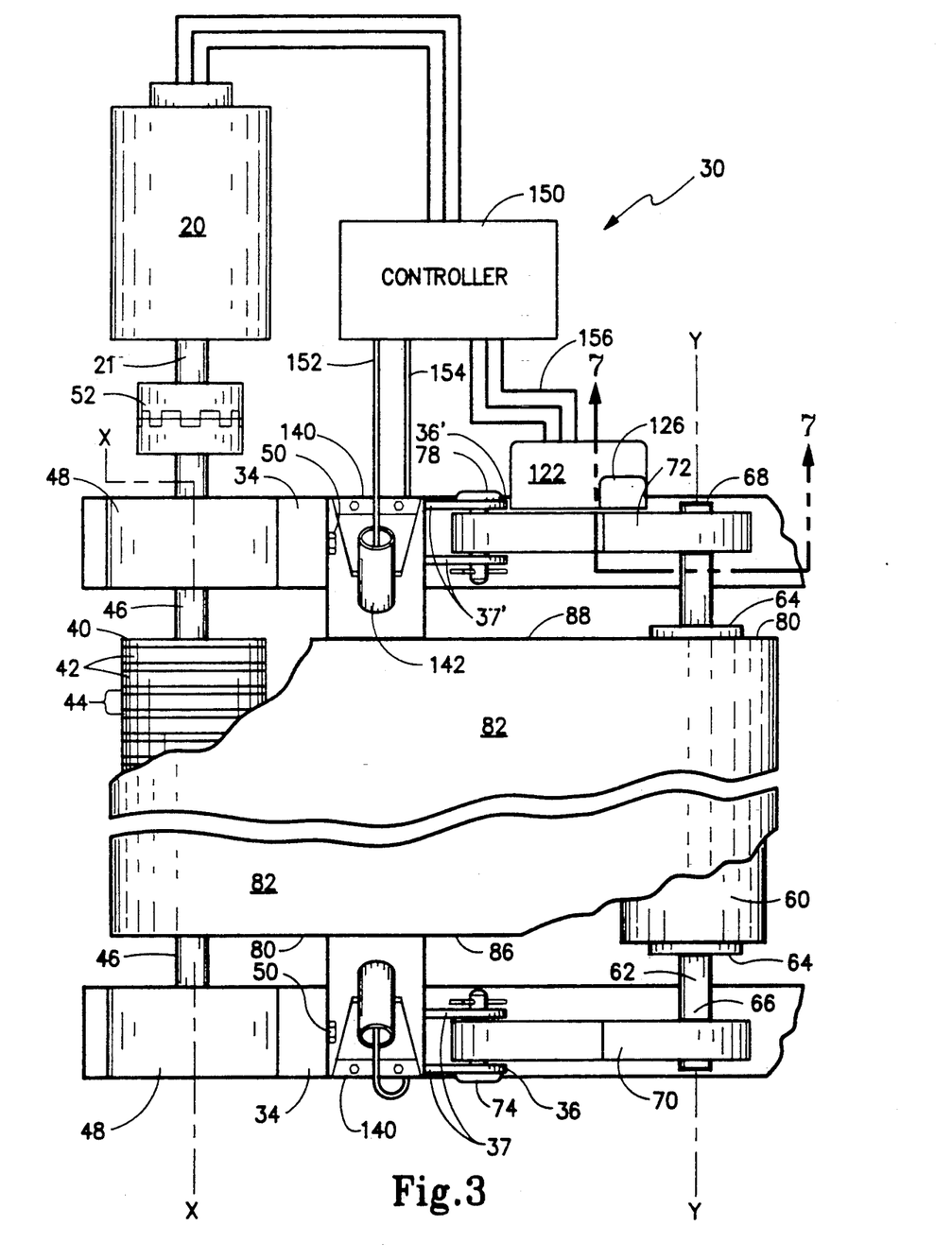
FIG. 3 is a top plan view, partially broken away, showing the separator assembly of FIG. 1.

The broad features of separator assembly 30 are best shown with reference to FIGS. 2 and 3. In these figures, it may be seen that separator assembly 30 includes a central frame 32 formed by a pair of mounting blocks 34, bracket pairs 36, 36' and a central beam 38 to which blocks 34 and bracket pairs 36 and 36' are attached, such as by suitable weldments or other attachment techniques. A magnetic roller 40 is rotatable journaled to central frame 32 for rotation about a magnetic roller axis "X" with roller 40 being postioned at a downstream location when mounted in material separator 10. To this end, magnetic roller 40 is constructed as a plurality of high-energy, rare-earth permanent magnetic disks 42 interleaved with steel disks 44. Roller 40 is mounted to an axle 46 that is rotatably journaled in a pair of bearing blocks 48 secured by bolts 50 to mounting blocks 34. Axle 46 is coupled to shaft 21 of motor 20 by means of coupling 52 so that motor 20 may rotatably drive roller 40 in the direction of arrow "B" shown in FIG. 2.

An idler roller 60 is rotatably journaled on an idler axle 62 by means of a pair of bearings 64 so that idler roller 60 may rotate about an idler roller axis "Y". Idler axle 62 had opposite ends 66 and 68 respectively received by movably mounting members provided by pivot arms 70 and 72 as described more thoroughly below. Bracket pairs 36 are formed by a pair of spaced apart bracket plates, such as plates 37 and 37'. Pivot arm 70 is pivotally mounted between plates 37 of one bracket pair 36, and pivot arm 72 is pivotally mounted between bracket plates 37' of the other bracket pair 36.

As noted above, conveyor belt 80 is in the form of a continuous loop and extends around magnetic roller 40 and idler roller 60 so that belt 80 has an upper conveying portion 82 and a lower return portion 84, as is shown in FIG. 2. Belt 80 is preferably a relatively thin belt constructed of Kevlar$^R$ fabric. Also as is shown in FIG. 2, it may be seen that separator assembly 30 may be positioned on horizontal support beams 24 of framework structure 12. Where separator assembly 30 is an independent module, as is the case of the exemplary embodiment, separator assembly 30 may be held in position by means of any suitable pin, such as pin 25 which may be received through a selected hole 26 in beam 24 and mated with a bore 35 in mounting blocks 34, such as shown in phantom in FIG. 2. Thus, separator assembly 30 may be adjustably positioned in the upstream and downstream directions with respect to framework structure 12.

Figure 4:
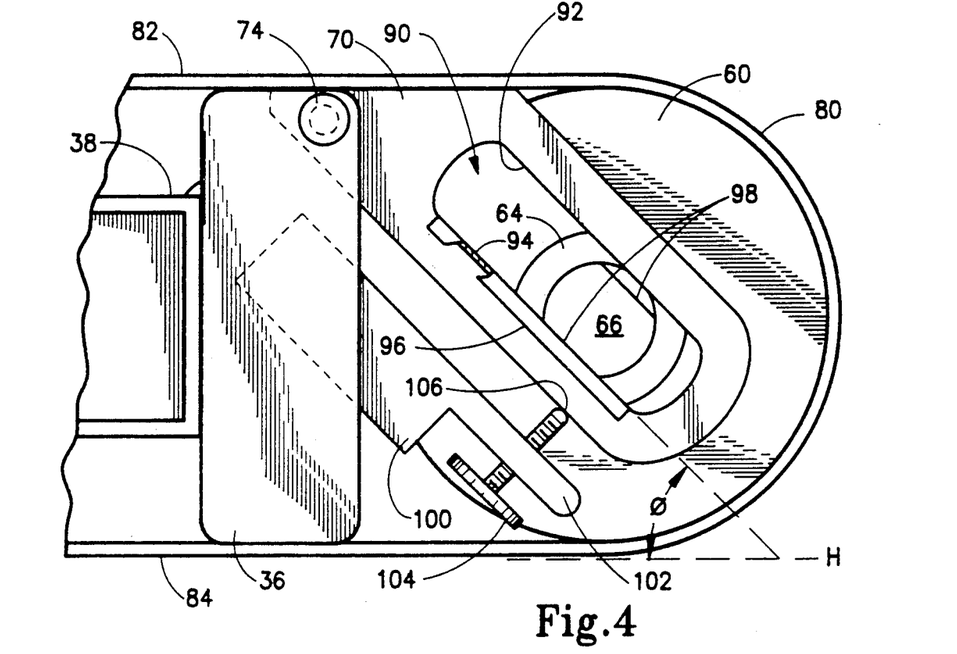
FIG. 4 is an enlarged side view in elevation showing a first side of the idler roller and mounting structure therefore locating at the upstream end of the separator assembly of FIG. 3.
Figure 5:
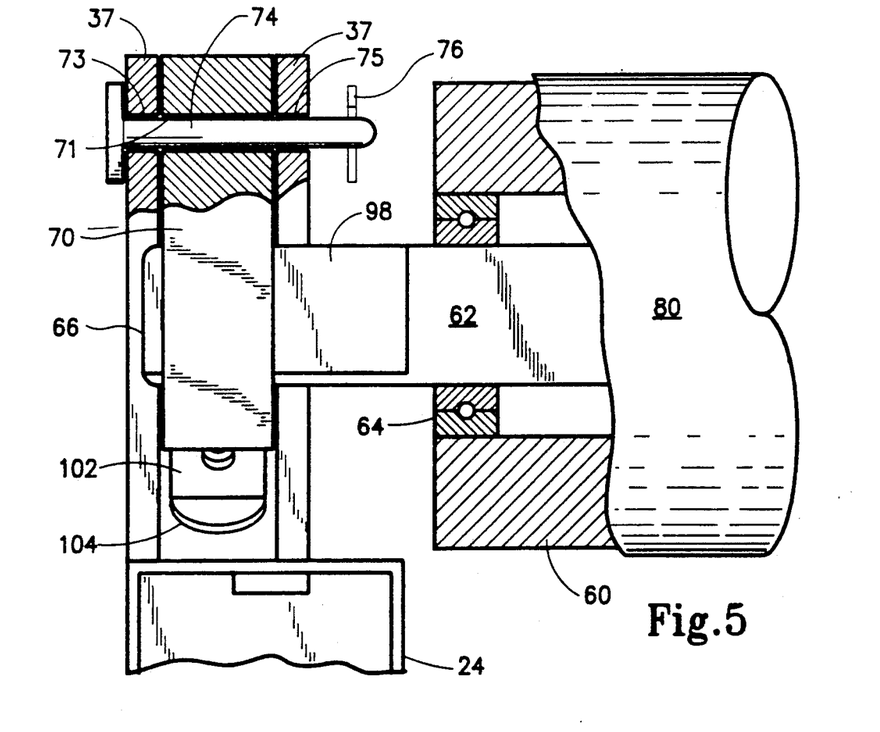
FIG. 5 is an end view in elevation, partially broken away, of the idler roller and mounting structure shown in FIG. 4.

The mounting structure supporting axle 62 at a first end 66 is best shown in FIGS. 4 and 5. In these two figures, it may be seen that the first bracket pair 36 is formed by a pair of bracket plates 37 which are spaced apart from one another and which receive pivot arm 70 therebetween. Pivot arm 70 is secured for pivotal motion with respect to bracket pair 36 by means of a pivot pin 74 extending through holes 75 in bracket plates 37 and a bore 71 in pivot arm 70. Pivot pin 74 may be retained in position by means of a cotter pin 76. Pivot arm 70 includes a slideway in the form of an elongated slot 90 that has an upper surface 92 and a lower surface 94 which are spaced apart from one another to define a slot width. Surface 94 is covered by a layer of low friction material which may be materials such as ultra high weight molecular plastics, polytetrafluoroethylene, ceramics and the like. As is shown in FIG. 4, this layer of low friction material is provided in the form of an inverted channel piece 96 which receives surface 94 of pivot arm 70 and overlaps on the opposite sides thereof. Together, channel piece 96 and surface 94 of slot 90 define an inclined support surface which is orientated at an acute angle 0 with respect to the horizontal plane "H". Axle 62 is cylindrical in shape and has a diameter that is greater than the width of slot 90. End 66 of axle 62, however, has a pair of flattened faces 98 which are oriented diametrically opposite one another and are spaced apart a distance less than the width of slot 90 so that end 66 is received in slot 90 for free sliding movement along channel piece 96. At the same time, the diameter of axle 62 prevents it from rotating in slot 90.

A rigid arm member 100 is affixed between plates 37 and extends at an inclined angle with respect to the horizontal to terminate in wing 102 of reduced dimension. An adjustment screw 104 is threadably received through wing 102, and screw 104 has a free end 106 which abuts pivot arm 70. Thus, as screw 104 is adjusted, angle 0 can be varied.

Figure 6:
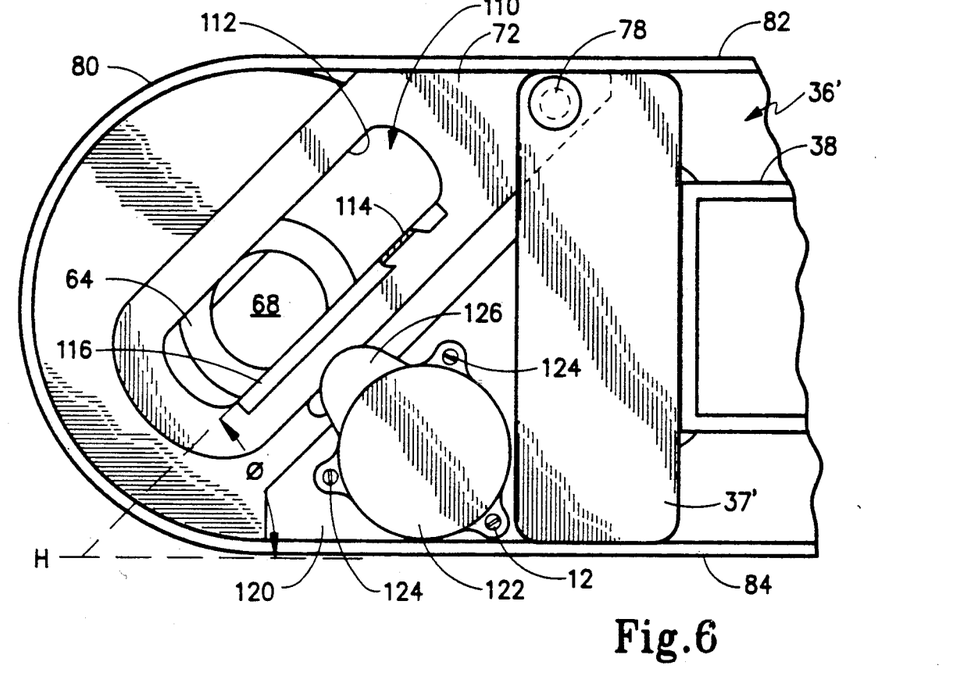
FIG. 6 is an end view in elevation of a second side of the idler roller and mounting structure therefore located at the upstream end of the separator assembly of FIG. 3 but showing the end of the idler roller opposite of that shown in FIG. 4.

Support for axle 62 at end 68 is provided by a second mounting structure shown in FIGS. 3 and 6. Here, it may be seen that pivot arm 72 is pivotally mounted between a pair of plates, such as plate 37' comprising the second bracket pair 36' by means of a pivot pin 78. This structure is substantially the same as that described with respect to FIG. 4 and pivot arm 70; therefore, this description is not again repeated.

Pivot arm 72 is provided with an elongated slot 110 having an upper surface 112 and a lower surface 114. Surface 114 is provided with a channel piece 116 formed of a low friction material. Channel piece 116 and surface 114 form an inclined slide surface for end 68 of axle 62 with this inclined surface oriented at an acute angle 8 with respect to the horizontal plane "H". End 68 of axle 62 again has flattened faces, similar to end 66 so that it may freely slide within slot 110 without rotation.

Figure 7:
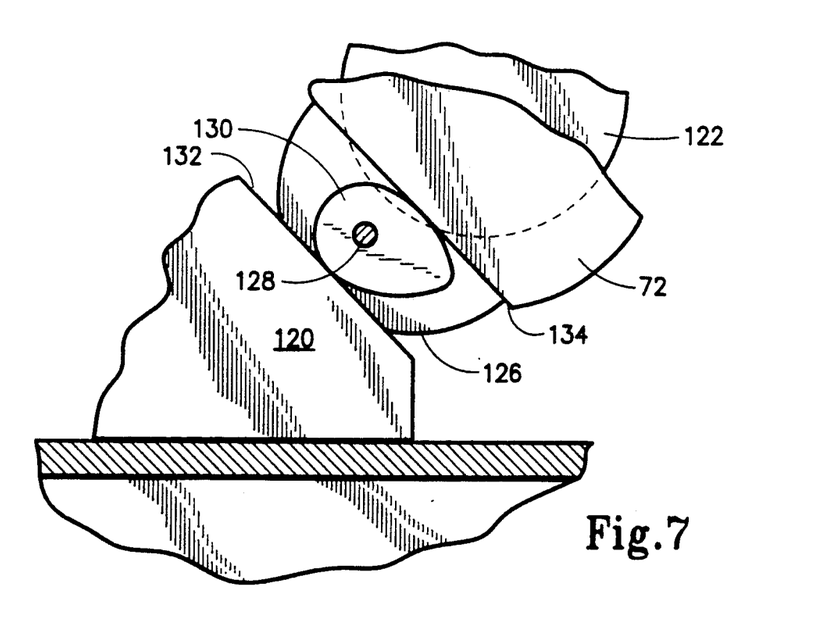
FIG. 7 is a cross-sectional view taken about line 7—7 of FIG. 3 showing the cam adjustment assembly according to the exemplary embodiment of the present invention.

While pivot arm 72 could be provided with a similar adjustment structure as described with respect to FIG. 4, a different pivot structure to vary angle 8 is provided in the exemplary embodiment. As is shown in FIGS. 6 and 7, a rigid arm member 120 is mounted between plates 37' of bracket pair 36' and supports a motor drive 122 mounted by means of screws 124. Motor drive 122 has a suitable gear reduction box 126 from which extends a shaft 128 that mounts a positioning element in the form of a cam 130. Cam 130 is positioned between an upper surface 132 of arm member 120 and a lower surface 134 of pivot arm 72 to interact between the arm member 120 and pivot arm 72. Thus, it may be seen that rotational actuation of cam 130 by motor drive 122 will cause angle θ to be adjustably varied. It should also be understood with respect to the descriptions of FIGS. 4–7 that other structures providing means for adjusting angles θ and δ are within the scope of this invention. Further, as is seen in FIGS. 2, 4 and 6, it is desirable that the length of conveyor belt 80 be selected so that ends 66 and 68 of idler axle 62 are positioned centrally in slots 90 and 110 and thus centrally along the respective slide support surfaces.

The remaining structure and operation of the exemplary embodiment of the present invention, in the form of separator assembly 30 may now be understood with reference to FIGS. 1–7. Due to the weight of roller 60 and axle 62 acting on the inclined support surfaces supporting ends 66 and 68 of axle 62, tension on conveyor belt 80 is dependent upon angles θ and δ since when mounted in the framework assembly, the inclined support surfaces extend forwardly and upwardly with respect to the downstream direction. Thus, the lesser the acute angle θ and δ, the less the tension placed on belt 80 by idler roller 60. Correspondingly, increasing angles θ and δ increases the tension on belt 80. This is possible since axle 62 "floats" in slots 90 and 110. Accordingly, thumb screw 104 and cam 130 may be positioned so that angle θ and δ are approximately the same and together and produce the desired tension on belt 80. When belt 80 is driven by motor 20, however, it is possible for belt 80 to drift from the desired tracking path on rollers 40 and 60. To this and, as shown in FIGS. 1–3, a pair of brackets 140 are mounted on beam 38 and, in turn, support monitor means including a pair of detectors 142 which monitor the position of side edges 86 and 88 of belt 80. Detectors 142 are proximity detectors so that, as belt 80 drifts from the desired tracking path, edges 86 and 88 move away from and toward their respective detectors 142. Detectors 142 produce a signal corresponding to the distance of the respective edge 86, 88 with this signal providing a deviation signal corresponding to deviation of belt 80 from the tracking path. The deviation signal is transmitted to a controller 150 by means of wires 152 and 154. Controller 150 responds to these signals by then transmitting a controlling signal to motor 122 by means of wires 156 in order to increment cam 130 so that the angle of inclination δ is automatically varied either positively or negatively. This slight variance of angle δ is sufficient to maintain the position of belt 80 on the desired tracking path without appreciably varying the tension on belt 80, thus automatically correcting belt deviation.

Figure 8:
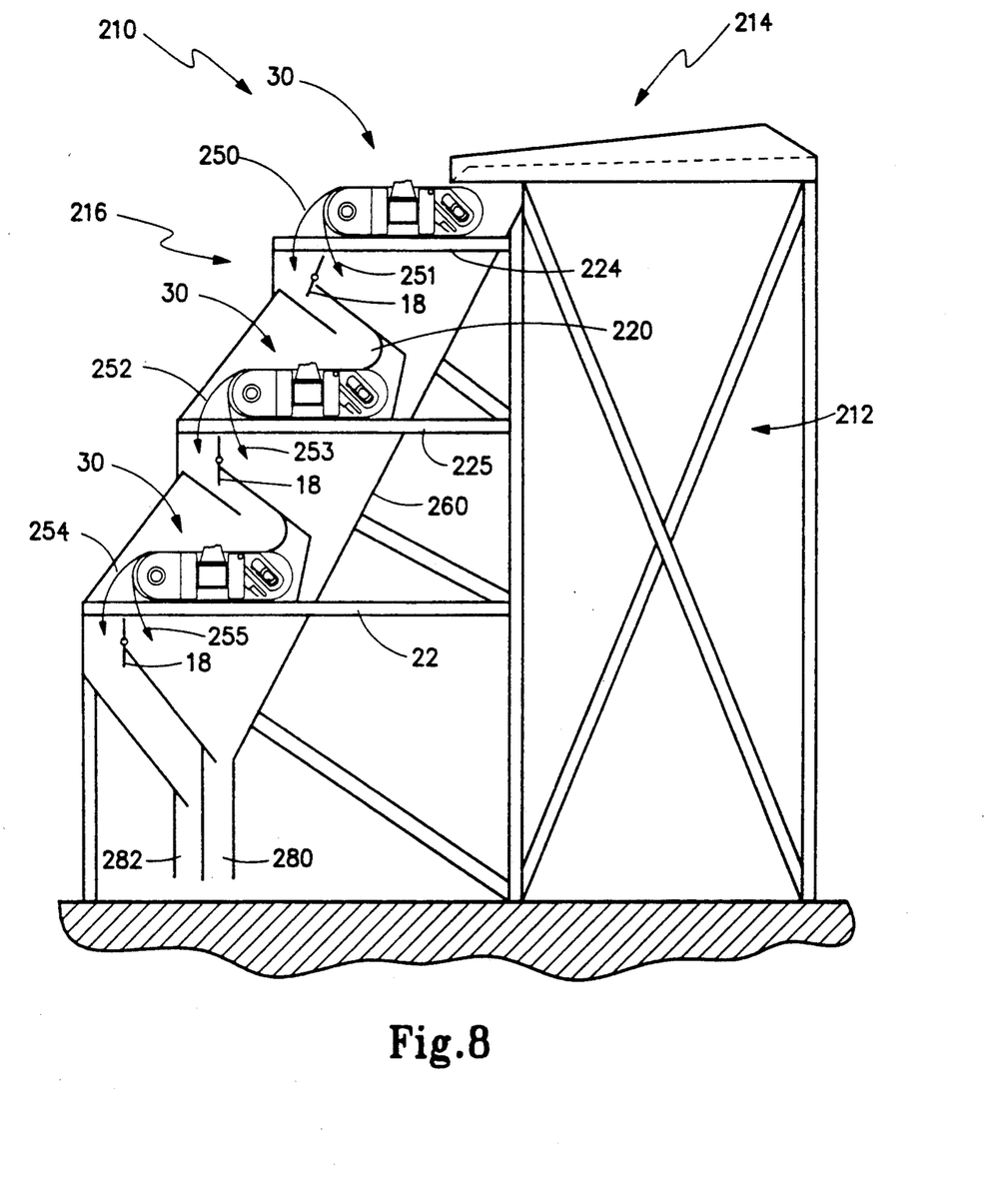
FIG. 8 is diagrammatic view showing a multi-stage materials separator incorporating the separator assembly according to the exemplary embodiment of the present invention.

With reference to FIG. 8, it may be seen that a multistage material separator can be constructed using a plurality of separator assemblies 30. Here, each separator 30 may be supported on a respective horizontal beam such as beams 224, 225 and 226 which form part of framework structure 212. Framework structure 212 includes a feeder assembly 214 which dispenses particulate material at an upstream location onto uppermost separator assembly 30. This separator assembly discharges the particulate material at a downstream location and it may be seen that non-magnetic components follow a trajectory path represented by arrow 250 while magnetic components follow a sharper trajectory in the direction of arrow 251. A deflector plate 218 (also shown in FIG. 1) may be adjustably positioned so that these two components are separated so that the magnetic component descends to outlet 280 along sidewall 260. The non-magnetic component is discharged at location 220 at an upstream location onto an intermediate separator assembly 30. This separation process is repeated at the intermediate stage so that residual magnetic components follow the path of arrow 253 while non-magnetic components follow path 252. Similarly, a lowermost separator assembly 30 can further separate any remaining residual magnetic components, as shown by arrow 255, while the refined non-magnetic components follow the path of arrow 254. The non-magnetic components are ultimately are discharged out of outlet 282. The efficiency of the separation process can be adjusted by the various speeds at which the conveyor belts on separator assemblies 30 operate as well as the positioning of deflector plates 18. Naturally, this efficiency is also dependent upon the nature of the material to be separated, the nature of the magnetic and non-magnetic components and other variables not forming part of this invention.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. A material separator adapted to receive particulate material at an upstream region, to convey the particulate material in a downstream direction and to discharge said material at a downstream region in a manner whereby magnetic and non-magnetic components of said particulate material have different discharge trajectories, comprising:
   (a) a support frame;
   (b) a pair of opposed mounting members connected to said support frame at an upstream location and spaced apart from one another, each of said mounting members provided with an inclined support surface that extends upwardly and forwardly in the downstream direction at an acute angle of inclination with respect to a horizontal plane;
   (c) an idler roller rotatably mounted with respect to said support frame on an idler axle, said idler axle having opposite ends slideably supported on the inclined support surfaces of said pair of mounting members so that said idler roller is located proximate the uperstream region;
   (d) a magnetic roller rotatably journaled with respect to said support frame for rotation about a magnetic roller axis and positioned downstream of said idler roller;
   (e) a continuous loop conveyor belt extending around said magnetic roller and said idler roller so as to have an upper conveying portion and a lower return portion whereby tension is maintained on said conveyor belt by gravitation force acting on said idler roller and said idler axle which gravitational force biases said idler axle downwardly and rearwardly awy from said magnetic roller axis along the inclined support surfaces; and
   (f) drive means for advancing said conveyor belt around said magnetic roller and said idler roller along a tracking path whereby said conveying portion can receive the particulate material at an upstream region and convey the particulate material downtream and across said magnetic roller to a discharge location whereby the magnetic components of the particulate material interact with a magnetic field generated by said magnetic roller so as to have a different discharge trajectory from the non-magnetic components of the particulate material.

2. A material separator according to claim 1 including a layer of low friction material on each inclined support surface such that the opposite ends of said idler axle are received on a respective layer.

3. A material separator according to claim 2 wherein said low frction material is selected form a group consisting of ultra high molecular weight plastics, polytetrafluoroethylene and ceramics.

4. A material separator according to claim 1 wherein at least one of said mounting members is movably secured with respect to said support frame and including adjustment means for varying the position of the respective inclined support surface.

5. A material separator according to claim 4 wherein said one of said mounting members is pivotally connected with respect to said support frame, said adjustment means operative to vary the angle of inclination of the respective inclined support surface.

6. A material separator according to claim 5 wherein said adjustment means including a positioning element and actuator means for moving said positioning element to selectively vary the angle of inclination.

7. A material separator according to claim 6 wherein said positioning element is a cam.

8. A material separator according to claim 6 including monitor means for monitoring the tracking path of said conveyor belt and for producing a deviation signal when said conveyor belt deviates from the tracking path, and including control means for operating said actuator means in response to the deviation signal to move said positioning element so as to vary the angle of inclination thereby causing said conveyor belt to return to the tracking path.

9. A material separator according to claim 8 wherein said conveyor belt has a pair of side edges, said monitor means including a pair of detectors, each said detector monitoring the position of a respective side edge.

10. A material separator according to claim 9 where said detectors are proximity detectors.

11. A material separator according to claim 1 wherein each of said mounting members is pivotally connected with respect to said support frame and including adjustment means associated with each of said mounting members for varying the respective angle of inclination of the respective inclined support surface thereof.

12. A material separator according to claim 1 wherein each of said mounting members includes an upstanding bracket and a pivot arm pivotally connected thereto, each said pivot arm having an elongated slot formed therein so that the slot defines a slideway having an upper surface and a lower surface spaced apart from one another to define a width for the slot, the lower surface of each of the slideways forming the inclined support surface for the respective mounting member.

13. A material separator according to claim 12 wherein each of said mounting members includes a rigid arm member secured to said upstanding bracket and extending alongside said pivot arm associated therewith, and including an adjustment means associated with each said rigid arm member and each said pivot arm for varying relative orientation thereof to vary the angle of inclination of the lower surface of the respective said slideway.

14. A material separator according to claim 12 wherein said idler axle is cylindrical and has a diameter that is greater than the width of each of the slots in said pivot arms, the opposite ends of said idler axle each having a pair of flattened faces diametrically opposite one another and spaced apart a distance less than the width of the associated slot so that the opposite ends of said idler axle are received in the associated slot without rotation therein, said idler roller rotating on bearings mounted on said idler axle.

15. A material separator according to claim 1 wherein said conveyor belt has a length such that the opposite ends of said idler axle are each positioned centrally of the respective inclined support surface.

16. A magnetic separator unit for use in a materials separator apparatus having a framework structure, a feed assembly located at an upstream location and a collection assembly located at a downstream location, said separator unit adapted to receive particulate material and to process said particulate material by separating said particulate material into magnetic and non-magnetic components and comprising:
  (a) a central frame securable to said framework structure at a selected frame mount location;
  (b) first and second opposed pivot arms each pivotally mounted to said central frame at an upstream side thereof and spaced apart from one another, each said pivot arm provided with a slideway defining an inclined support oriented at an acute angle with respect to a horizontal plane when said central frame is secured to said framework structure at the frame mount location;
  (c) a magnetic roller rotatably journaled to said central frame for rotation about a magnetic roller axis and positioned at a downstream location when said central frame is secured to said framework structure at the frame mount location;
  (d) an idler roller having an idler axle slideably supported at opposite ends on said slideways, said idler roller rotatably journaled on said idler axle for rotation about an idler roller axis;
  (e) a continuous loop conveyor belt extending around said magnetic roller and said idler roller so as to have an upper conveying portion and a lower return portion adapted for advancement along a continuous tracking path, said central frame having an upstream section of said upper conveying portion positioned to receive particulate material from said feed assembly when in the frame mount location such that when said conveyor belt is advanced along the tracking path said particulate material is conveyed in a downstream direction to be discharged into said collection assembly; and
  (f) first and second adjustment means associated respectively with said first and second pivot arms for pivoting the respective pivot arm to vary the angle of inclination of the slide surface of said slideway whereby tension on said conveyor belt resulting from the weight of said idler roller and said idler axle may be adjusted.

17. A magnetic separator unit according to claim 16 wherein one of said first and second adjustment means includes a positioning element and actuator means for moving said positioning element to selectively vary the angle of inclination.

18. A magnetic separator unit according to claim 17 including monitor means for monitoring the tracking path of said conveyor belt and for producing a deviation signal when said conveyor belt deviates from the tracking path, and including control means for operating said actuator means in response to the deviation signal to move said positioning element so as the vary to angle of inclination thereby causing said conveyor belt to return to the tracking path.

19. A magnetic separator unit according to claim 18 wherein said conveyor belt has a pair of side edges, said monitor means including a pair of detectors, each said detector monitoring the position of a respective side edge.

20. A magnetic separator unit according to claim 19 where said detectors are proximity detectors.

21. A material separator according to claim 18 wherein said positioning element is a cam.

22. A magnetic separator unit according to claim 16 wherein each said first and second pivot arm has an elongated slot formed therein so that the slot defines the respective slideway thereof, each slot adapted to receive a respective end of said idler axle and having a lower surface providing the inclined support therefor.

23. A magnetic separator unit according to claim 16 including first and second rigid arm members secured to said central frame and respectively extending alongside said first and second pivot arms, said first adjustment means interacting between said first pivot arm and said first rigid arm and said second adjustment means interacting between said second pivot arm and said second rigid arm.

24. A magnetic separator unit according to claim 16 wherein each of the inclined supports includes a low friction material operative to reduce resistance to sliding movement of the opposite ends of said idler axle therealong.

25. A magnetic separator unit according to claim 16 including drive means for advancing said conveyor belt along the tracking path.

26. A magnetic separator unit according to claim 25 wherein said drive means includes a motor coupled to said magnetic roller to rotatably drive said magnetic roller.

27. A magnetic separator unit according to claim 16 including means for selectively securing said central frame to said framework structure whereby the frame mount location may be selectively varied.

* * * * *